April 12, 1955  T. M. DOLLER  2,706,053
COOKIE STACKER
Filed Nov. 8, 1951  5 Sheets-Sheet 3
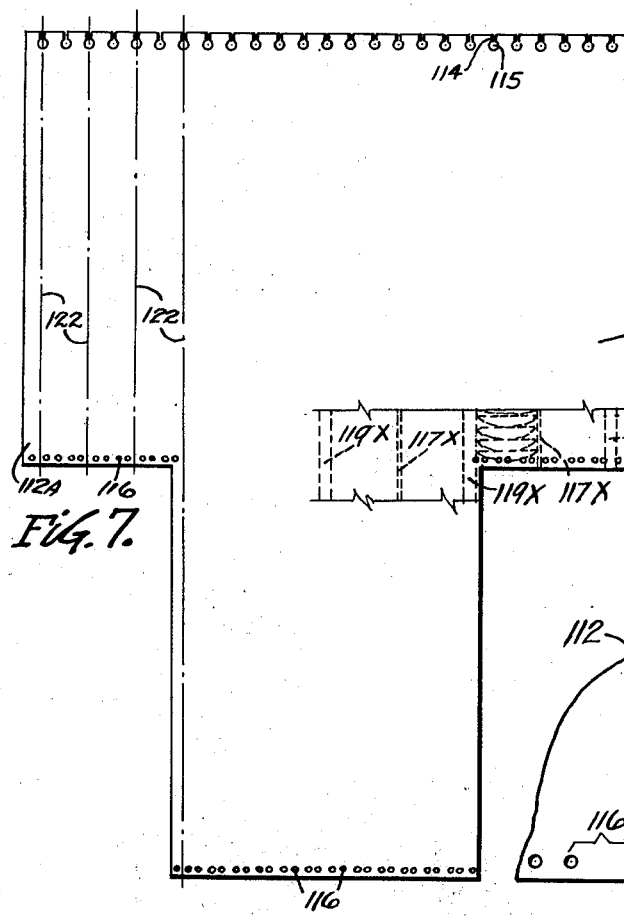
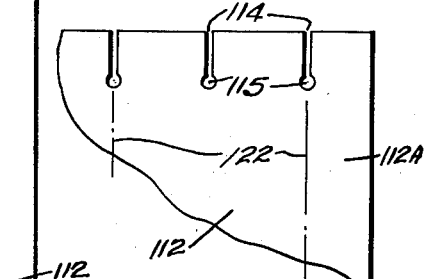
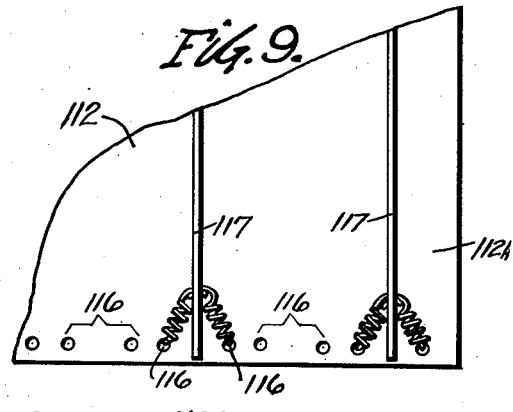
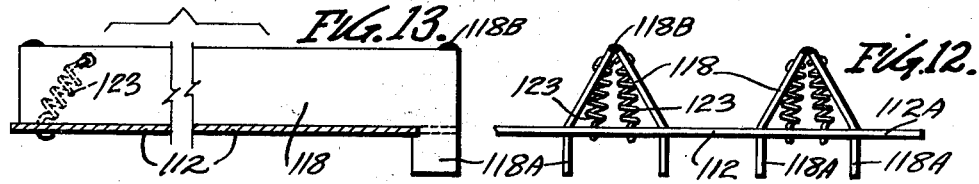
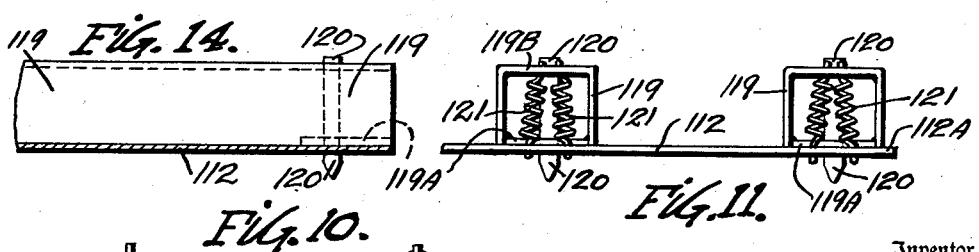
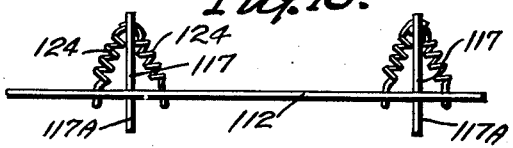
Inventor
THEODORE M. DOLLER
By Weatherford and Weatherford
Attorneys April 12, 1955      T. M. DOLLER      2,706,053
COOKIE STACKER
Filed Nov. 8, 1951      5 Sheets-Sheet 4
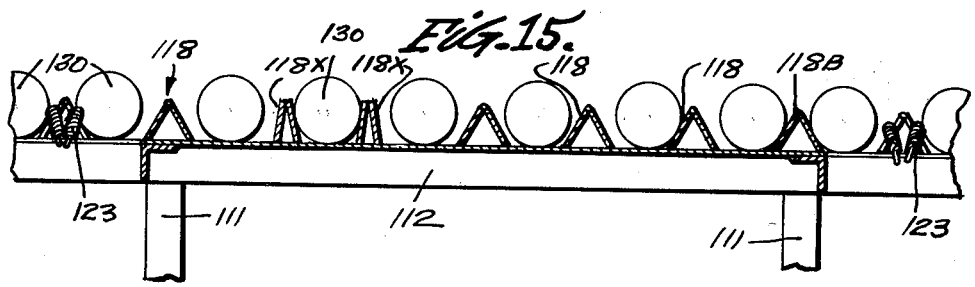
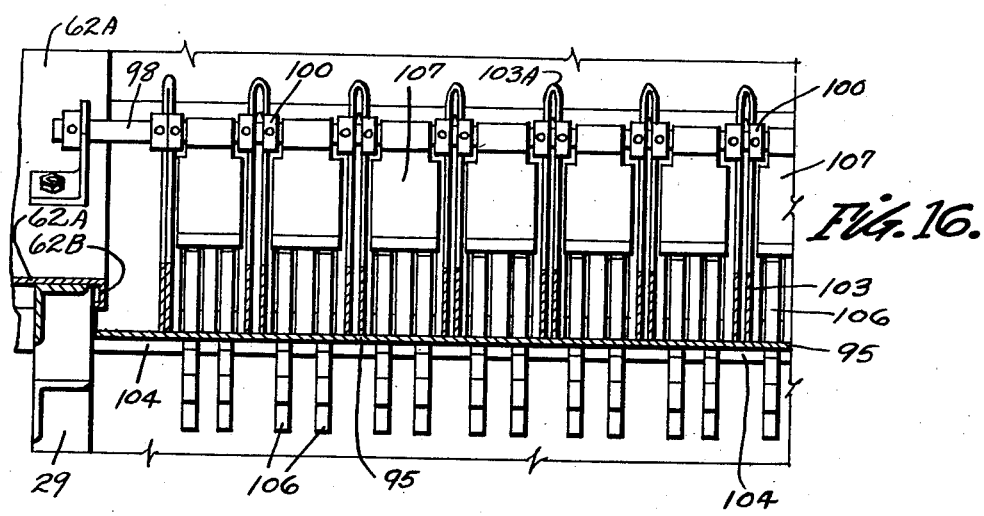
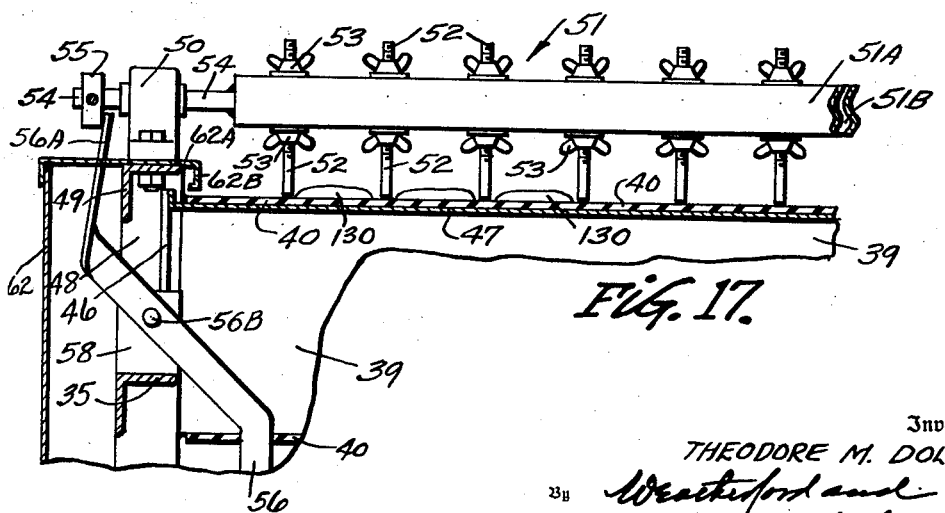
Inventor
THEODORE M. DOLLER
By Weatherford and Weatherford
Attorneys April 12, 1955 T. M. DOLLER 2,706,053
COOKIE STACKER Filed Nov. 8, 1951 5 Sheets-Sheet 5

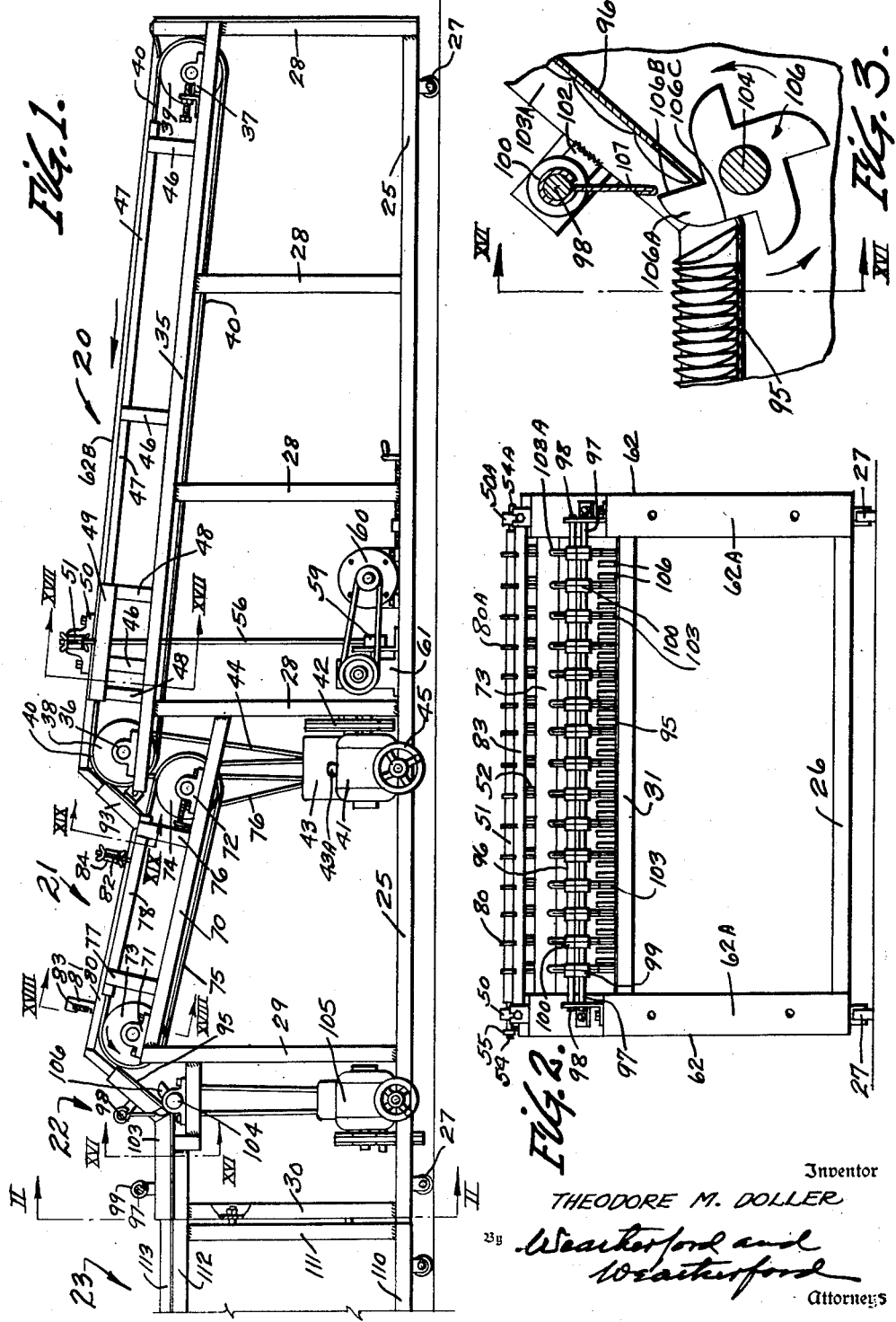

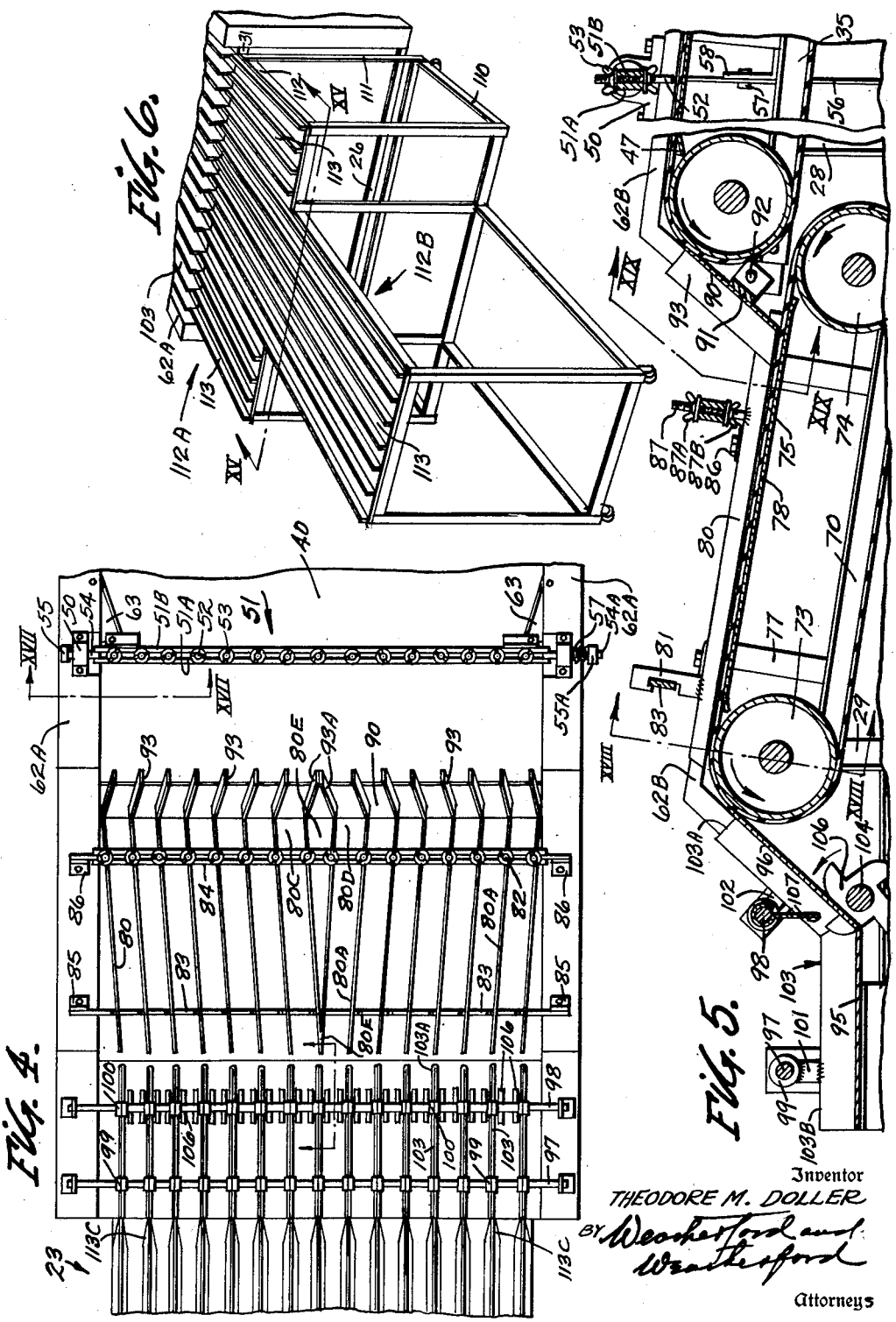

Inventor
THEODORE M. DOLLER
By Weatherford and Weatherford
Attorneys

United States Patent Office 2,706,053
Patented Apr. 12, 1955

2,706,053

COOKIE STACKER

Theodore M. Doller, Memphis, Tenn.

Application November 8, 1951, Serial No. 255,489

18 Claims. (Cl. 214—7)

This invention relates to mechanisms for transferring, and alining in rows fragile baked articles such as cookies, crackers, thin flat biscuits or the like, upending them from a flat position on a conveyor to an upright back to front position in alined rows and further advancing the rows to a pickup table adapted to facilitate the transfer of row portion, or stacks, of desired length to boxes or other suitable receptacles.

Articles of this type usually come from the oven on flat metal trays which may be transferred by a chain belt conveyor for initial cooling. The trays are eventually picked up by hand and inverted and dumped, or slid off without inverting into a pile from which pile they may be sorted by hand into stacks.

It has become more usual, however, to deposit the articles on a belt and transfer them to a delivery or pickup station, the surface of the supporting belt being divided by longitudinally disposed shallow ribs into channelways which aline the articles. Somewhere along these channelways the articles are upended so that they stand on edge usually face to back. At the delivery station the articles are removed by hand in stacks of desired length and placed in boxes or other suitable packages.

In machines as known for this purpose, feeding the articles dumped on an approach belt into the channelways without jamming and piling up, has been an ever present and unsolved problem;

Providing channelways of proper width for an almost endless variety of sizes of articles, is expensive, but even more objectionably it may cause operational delays interfering seriously with the functioning of the substantially inexorable baking operation.

Upending without complete overturning has been none too satisfactorily accomplished.

Final alinement of the individual articles of the stack of articles, at the stack removal station, is unsatisfactory unless the channelways closely engage the particular size article and if snug enough to effect proper alinement this makes removal access difficult, and especially where the stack has a considerable length as of the nature of twelve inches or more and the articles are of small diameter or width has been far from satisfactory.

Access to all the channels of a wide stacker for removal of the stacks therefrom has also been unsatisfactory.

Among the objects of the present invention are to provide in a stacker for cookies, or other similar more or less fragile articles:

Means for separating and leveling out piles of the articles being approached on a belt to the stacker channelways, into single layer rows of the articles, and directing the rows each respectively into a channelway of the stacker;

Means for causing the articles in each channelway irrespective of the size or the articles and the width of the channelway to follow along one side of the channelway as the articles are passed through the channelway and thereby establish alinement;

Means for upending each article independently as it approaches the stack assembly and pickup channels and means cooperating with the upending means for preventing overturning of the article;

Means for providing a pickup table having a plurality of pickup channelways in which the channelways are arranged in groups of width readily accessible to pickup operators;

Means forming channelway sides for a pickup table, which may be manually temporarily displaced to decrease the width of any channelway of the table to a width governed by the size of the articles in the channelway, to thereby line up the articles forming the stack to be picked up and removed, which means may subsequently be manually oppositely displaced to increase the channel width and provide access whereby the stack may be picked up and removed.

The means by which the foregoing and other objects are accomplished and the manner of their accomplishment will readily be understood from the following specification on reference to the accompanying drawings, in which:

Fig. 1 is a side elevational view of the stacker with the foreground cover plate removed to disclose the frame and working parts.

Fig. 2 is an end elevational view of the stacker taken on the line II—II of junction of the stacker with the pickup table.

Fig. 3 is a much enlarged fragmentary sectional side elevational view of the article upending cam, and cooperating swinging gate.

Fig. 4 is a plan view of the alining and upending section of the stacker with fragmentary portions of the pickup table and approach section.

Fig. 5 is an enlarged sectional side elevational view of the stacker section and fragmentary portions of the adjacent sections.

Fig. 6 is a perspective view of the pickup table with ribs in place.

Fig. 7 is a plan view of the pickup table top before placing ribs.

Figs. 8 through 14 are enlarged scale views.

Fig. 8 is a fragmentary plan of a corner of the feed-in end of the table.

Fig. 9 is a plan of a corner of the terminal end of the table showing anchorage of two channel forming ribs.

Figs. 10, 11, and 12 are end elevational views of the terminal end of the table and respectively show single strip ribs, box-type ribs and double strip inverted V type ribs.

Fig. 13 is a side elevational view of the end portions of the V type ribs of Fig. 12 showing opposite end anchorages to the table top, and also shows the single rib type of Figs. 9 and 10, with the foreground anchor spring removed.

Fig. 14 is a side elevational view of the feed-in end of the box type ribs, showing pin anchorage of a rib to the table.

Fig. 15 is a transverse fragmentary view taken as on the line XV—XV of Fig. 6, showing a sectional elevation of the center channelways and end elevational view of adjacent flanking channels, with a stack of the articles being finally straightened for removal.

Fig. 16 is a fragmentary transverse sectional elevational view taken on the line XVI—XVI of Figs. 1 and 3.

Fig. 17 is a fragmentary transverse sectional elevational view taken on the line XVII—XVII of Fig. 1, and Fig. 4 looking in the direction of the arrows and parallel to the belt surfaces.

Figure 18:
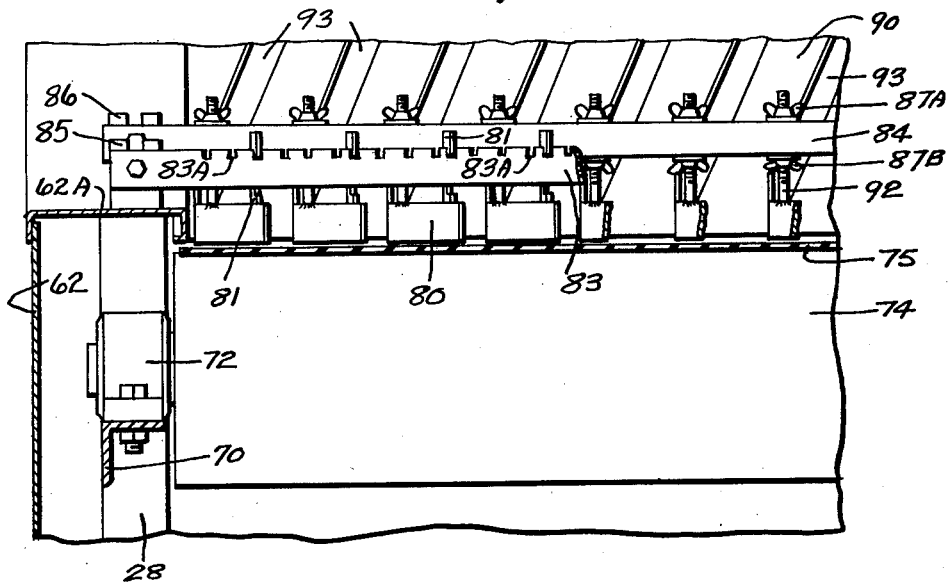

Fig. 18 is a transverse sectional elevational view taken on the line XVIII—XVIII of Figs. 1 and 5, showing fragmentary portions of adjustable partition supports.

Figure 19:
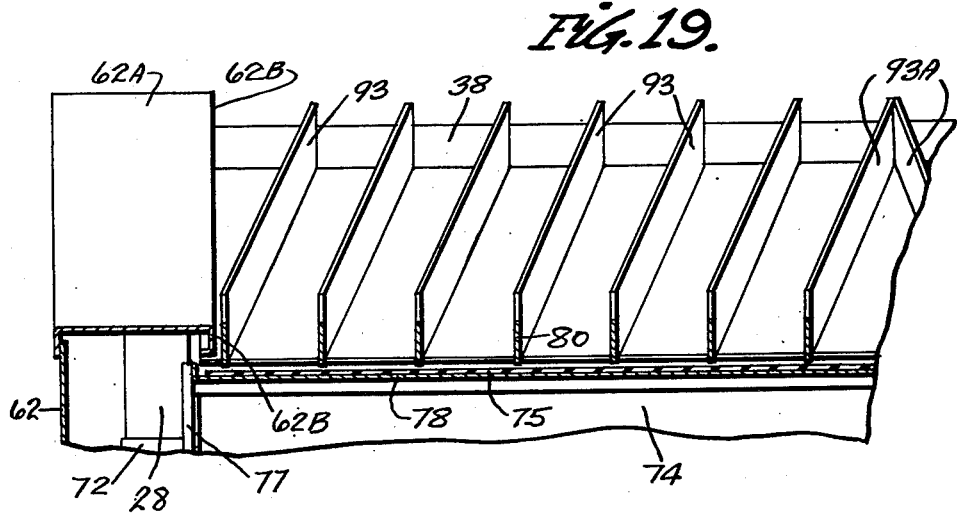

Fig. 19 is a related cross sectional view taken on the line XIX—XIX of Figs. 1 and 5.

Referring now to the drawings in which the various parts are referred to by numerals, the stacker preferably comprises four sections, namely a receiving and column forming section 20, an alining section 21, an upending section 22, and a pickup table 23. As shown the first three of these sections are an integral structure, with the pickup table an independent structure attached to the section structure. It will be understood, however, that the sections (though not so shown) may be independent units secured together substantially in the manner that the pickup table is secured to the other sections, and that this is particularly true of the upending section 22 in which adjustment of channel widths is most difficult, and which has an independent drive.

The machine may comprise longitudinal side members 25, and transverse members 26, forming a base which may be supported by rollers 27. The connection between these members and other connections hereinafter mentioned, unless otherwise noted, being preferably made by welding. From the base, posts 28, 29 and 30, extend upward and are transversely connected by a cross member 31, and other similar members (not shown).

The posts 28 are connected at their upper ends to longitudinal side members 35 and form a frame for the section 20.

Bearings 36, 37 mounted on opposite ends of the frame respectively journal drums 38 and 39 which carry an endless belt 40 substantially frame width. One of the drums, preferably the forward one 38, may be driven by a motor 41 through a belt and pulley drive 42, reduction gearing enclosed in a housing 43 and a belt and pulley drive 44. A handwheel 45 and screw (not shown) turned by the handwheel may be used for shifting the motor and tightening the belt drive 42.

Struts 46 extend upward from the frame side members 35 and carry a shallow pan 47 (Figs. 1 and 9) which supports the upper flight of the belt 40 between the drums 38 and 39. Upright members 48 also extending from the top frame members 35, and cap members 49, support guides 50 and 50A which reciprocably support a transversely disposed vibratory aliner 51 (Fig. 9). The aliner may include a pair of bars 51A, 51B spaced to receive aliner pins 52 which are adjustable along the bars, and are uniformly spaced and positioned in desired relation to the stacker channelways, later described, and are vertically adjusted to just clear the belt 40 and clamped in their desired positions by nuts 53. At opposite ends of the aliner, bar ends 54, 54A slidably extend through the guides 50, 50A. The opposite bar ends may carry collars 55, 55A, one of which as the collar 55, is engaged and longitudinally shifted by the upper end 56A of an oscillator 56. A spring 57 is interposed between the collar 55A on the opposite bar end 54A and the opposite guide 50A. The oscillator 56 is attached by a pivot pin 56B as to an upper portion 58 of the corresponding side frame of the stacker, and extends downward within the frame of the machine and engages and is laterally oscillated by an eccentric cam 59. The cam 59 may be driven by a motor 60 through reduction gearing housed in a casing 61, the resulting oscillator movements, though much reduced in number by the reduction gearing being still quite rapid. It will be noted that the length of the oscillator arm below the pivot pin 56B is so great as related to the upper end length that whatever the throw of the cam may be the movement of the upper end and of the aliner is a vibratory one. The aliner bar is moved outward by the oscillator arm movement and return movement effected by action of the spring 57.

The sides of the section 20, and the sections 21 and 22 are preferably closed by cover plates 62 (of which the foreground plate is removed in Fig. 1). These cover plates may have reentrant horizontal top portions 62A which may overlie the cap members 49 and be supported by the cap members and may be supported at the back end of the section by extensions 28A of the back posts 28. The top portions 62A preferably have downwardly extending inner edge portions 62B, which just clear the belt 40 and serve as the outsides of the channelways, and these edges may continue to the front end of section 22. Rearward of the aliner, deflectors 63 just clearing the belt extend from the pins 52A rearward and diverge outward to the edge portions 62B.

The forwardly disposed pair of the posts 28 and the posts 29 are connected to longitudinal side frame members 70 and with the lower side members 25 form a frame for the alining section 21. The side members 70 carry bearings 71, 72 which journal drums 73, 74 for an endless belt 75 of frame width. One of the drums as the drum 74 is driven through a belt 76, from the reduction gearing in the housing 43, the gearing including a driven shaft 43A which carries adjustable pulleys (not shown) of conventional type which drive the belts 44 and 76 and may be independently adjusted to vary the driving speed. Struts 77 extending upward from the side members 70, support a shallow pan 78, which underlies and supports the top flight of the belt between the drums 73 and 74.

Overlying the belt 75, are elongated plate-like ribs 80, 80A which are supported in overlying adjacency to the belt surface, by hangers 81 and 82 depending from transverse bridges 83, 84 respectively. Preferably the bridge 83 is a flat, strip spanning the belt in edgewise relation above the belt and supported at its ends by brackets 85 extending upward from the stacker sides. The strip has along its upper edge notches 83A with which hangers 81 are adapted to engage. These hangers have upper end portions adapted to engage over the bridge 83 and seat in any one of the notches, and depending portions integrally secured to the top edges of the ribs. The bridge 84 and hangers may be substantially identical if desired. Preferably, however, the bridge 84 comprises two flat strips spaced apart throughout their lengths, secured together at their ends in such spaced relation and supported from the stacker sides as by brackets 86. Disposed between the strips are vertically disposed threaded rods 87 each respectively having its lower end integrally secured to a rib 80. The rods are adjustable along the strips to effect the desired spacing of the ribs and are supported and clamped against displacement after adjustment by wing nuts 87A and 87B.

The ribs preferably are in two sets 80 and 80A as shown by the plan view Fig. 4 with the ribs of both sets spaced equally apart and forming equal width channelways.

The ribs of the two sets do not lie parallel to the longitudinal center line of the stacker and the line of travel of the belt 75. Preferably the ribs of the two sets are symmetrically disposed with regard to the longitudinal center line of the belt and stacker with all the ribs of both sets converging equally inward from their feed-in ends to their discharge ends. The feed-in ends 80C, 80D of the center pair of ribs of the sets 80 and 80A, are spaced apart preferably the width of one channel space and their discharge ends 80E brought together so that all belt carried articles larger than one half the rib spacing must contact and be deflected by and travel along the outer rib of the channel before the discharge ends of the channelways are reached, and definite alinement into columns and uniformity of spacing of the columns of the articles at the point of discharge is effected irrespective of the channel width, and one width of channelway is usable for articles varying in size from half to almost full channelway width and change of channelway width with each change of article size is therefore unnecessary.

Between the row establishing section 20 and the alining and column forming section 21, is a deflector section, preferably removable and replaceable which comprises a plate 90 having its lower edge in proximity to the top of the upper flight of the belt 75, the plate extending upward from the belt and deflecting rearwardly, and having its upper edge which may be thinned substantially to a knife edge, in stripping adjacency to the top flight of the belt 40 as it passes over the drum 38. At its opposite ends, the plate 90 may be detachably secured as by brackets 91 and bolts 92 to side portions of the section 20. The plate 90 carries deflectors 93, the central pair 93A of the deflectors coming together at their upper edges and converging downwardly and laterally outward into engagement with the feed-in ends 80C and 80D of the ribs 80, and the deflector oppositely outward therefrom being equally spaced and parallel thereto. The deflector section selected and used in any case has deflector spacing conforming to the width of channelways to be used, and forms a convenient control for adjusting the spacing of the aliner pins 52 and the column forming ribs 80, 80A.

The upending section 22 comprises a bottom plate angularly bent to form a horizontal portion 95 forwardly disposed and an upwardly and rearwardly inclined portion 96, the plate extending from side to side of the stacker and being secured to, and carried by, the sides of the stacker. Transverse rods 97 and 98 are supported at their ends by the sides of the stacker in overlying relation to the two bottom portions. Collars 99 in pairs are shiftably mounted for adjustment along the rod 97 and similar collars 100 in pairs on the rod 98. From the collars 99 and from the collars 100 dual hangers 101, 102, depend into supporting engagement with the ribs 103 conforming in spacing to the ribs 80 of the column forming section 21. Each of the ribs 103 is of dog leg shape adapted to lie against the angle shaped bottom, and may comprise identical sections of thin metal folded at the upper rearward end 103A of the rib, and away from that end may be separated (not shown) to constrict the channelway between two thereof.

Disposed rearwardly of the lower edge of the upwardly inclined portion 96 of the bottom plate is a transverse cam shaft 104 which is turned upwardly and forwardly by a motor-reduction gear assembly 105 (Fig. 1). The shaft 104 carries and turns cams 106 (Fig. 3) which are disposed between the ribs 103. Each cam has camming lugs 106A which may have radial rearward faces 106B and forwardly disposed faces 106C substantially parallel to their rearward faces, these forward faces at their outer ends arcuately curving rearwardly to a junction at right angles to their rear faces and substantially concentric at the junction with the shaft, the radial rear faces of the cam lugs stopping the downward progress of the articles, and the forward face of the following lug engaging the underside of the article and turning it upright and as the movement continues pushing the article against the previously upended article and advancing the stack of such articles thus formed toward discharge between the channel forming ribs 103 and into and along the channelways of the pickup table. Swung on the overlying transverse rod 98 above the cams are baffles 107 which engage the upper edges of the articles and prevent the cam action from overturning the articles.

The pickup table includes members 110 and 111 supporting a smooth flat top 112 which is adapted to be divided by attachable ribs into channelways 113 conforming in number and width to the channelways of the upending and other sections of the stacker.

The feed in end of the table is preferably provided with uniformly spaced open end slots 114, and holes 115 which may be at the inner ends of the slots. At the opposite or terminal end of the table are a like number of pairs of anchor holes 115 the same distance apart as the slots and longitudinally alined therewith.

Three types of ribs for dividing the surface of the table into channelways are shown; a single strip rib 117, Figs. 6, 9, and 10, a rib 118 of inverted V cross section Figs. 12 and 13, or a rib 119 of deep inverted channel cross section Figs. 11 and 14. The ribs 119 preferably have at their feed in ends anchor plates 119A and holes respectively in their top and plate portions adapted to be positioned over a selected one of the holes 115 in the table top 112 and each respectively anchored to the top in such position by a pin 120, though they may have lug portions as shown on the V ribs and later described to effect anchorage of the V ribs. The terminal ends of the ribs 119 are anchored to the table top each respectively by a pair of tension springs 121 engaged at the top 119B of the rib and spread apart and engaged at their lower ends with that pair of the holes 116 in the table top which are longitudinally alined with the holes 115 which is used. If desired markings as the lines 122 may be made on the top to facilitate such alinement. The V ribs 118 may be similarly pin anchored at their feed in ends to the table top (though this is not shown) or as shown in Fig. 13 may have downwardly extending lug portions 118A, which are spaced by spread of the V to conform to the spacing of any two adjacent slots 114. At their terminal ends each rib is anchored as is the channel rib by a pair of tension springs 123. The strips forming the sides of the V are secured together along the apex or ridge of the V at both ends and at spaced intervals along the ridge by spot welds 118B. The single rib type of strip has a lug portion 117A, identical with the lug 118A Fig. 13 of the V rib 118, which is engaged in one of the slots 114 to anchor the feed-in end of the rib 117, and at its terminal end is anchored to the top by tension springs 124.

Irrespective of the rib type used, the ribs are anchored to the table top only at the feed-in and terminal ends of the top and therebetween are free from the top and laterally displaceable as during removal of stacks of articles from the channelways therebetween. It will be understood that only the terminal half of the long ribs are fully accessible as pickup portions, and that holes corresponding to the holes 115 (though not shown) may be formed in the top in a transverse line substantially at the terminal ends of the short side or wing portions of the table, and lug or pin anchorage used at that point, thus evening up the lengths and characteristics of the pick-up channels of the feed in and terminal portions of the table.

Preferably the anchor slots 114 and holes 115 and the spring anchor holes 116 are so placed relatively to the edges of both the wider and narrower portions of the table that a narrow edge portion 112A lies outward from the outside ribs.

The table is readied for use by selecting the desired rib type and spacing these ribs as closely together as is possible to give channelways which will loosely receive the articles. Where these articles are round the V type ribs 118 are in general preferable. For rectangular articles the channel or single rib types 119 or 117 are indicated and these latter types may often be alternated to advantage as shown by the short portions of alternating channel and single ribs 119X, 117X shown in Fig. 7.

Access for removal of stacks of the articles from the channelways is from the sides of the table. In order that this access may be facilitated the table midway its length is abruptly stepped in equally from its opposite sides to make the forward portion 112A of the table about one half the width of the rearward portion 112B with the ribs defining the channelways extending the full length of the longer as well as the shorter portions of the table, and for purposes of removing stacks of articles providing four areas of access each one half of the overall table length and one fourth table width.

In use, the motor 60 establishing vibratory movement of the aliner pins 52, the motor 41 driving the belts 40 and 75 and the motor 105 driving the upending cams 106 are started up. Cookies or other thin, flat articles of similar type are delivered in batches usually of 100 to 150 articles, on the belt 40 and the batches are advanced by the belt into engagement with the aliner pins 52, any articles which lie against the side edge portion 62B being deflected inward of the outer pins 52A by the edge deflectors 63 Fig. 4. The pins separate the batches into rows of the articles directly alined with the upper ends of the channelways between the deflector ribs 93, 93A and these ribs deflect the articles slightly outward into the channelways between the ribs 80, 80A and onto the underlying belt 75 on which they lie flat and are moved forward. During this movement the outer edges of the articles contact the ribs 80, 80A respectively forming the outer sides of the channelways and form definitely alined columns of the articles. The belt 75 delivers these columns into the downwardly inclined channelways between the inclined portions 103A Fig. 5 of the ribs 103 and against the cams 106 by which they are upended and formed Fig. 3 into a continuous column of articles contacting the one or the other face to back. In upending the articles, the cams carry the upper portions of the articles into contact with the lower portions of the swinging gates 107 and the articles are prevented by the gates from being thrown past a vertical position. The columns are pushed forwardly by the outer rounded ends of the cam lugs 106A through the horizontal portions of the upended channelways into the channelways between the ribs 117, 118 or 119, as the case may be, of the table and to the ends of these channelways unless sooner removed manually.

The articles in the table channelways are picked up in stacks by operators who remove the stacks and place them in suitable containers. These stacks are slim columns usually more than a foot long and often comprise fifty or more articles each having a slightly rounded top in contact with the flat bottom of the adjacent article. Successful stack removal depends on maintaining alinement of the stack by end pressure. If the articles are small the columns tend to bow out of line and adjacent articles are relatively displaced, making the stack difficult to handle. If the articles are large a slightly oversize article may bind in the channelway and pull the stack as it is lifted from the channelway, out of line.

With the flexible rib construction shown, preparatory to removing a stack, if the articles are small relatively to the channel width, the operator may displace ribs, as the ribs 118X Fig. 15 on opposite sides of a column of articles 130 in the channelway against the articles, relatively centering them and aligning them into a straight column. The operator then releases the ribs, selects the length of stack to be removed, brings her fingers against the opposite ends of the stack and along the sides of the stack adjacent these ends, and largely by end pressure holds the stack in alinement during removal and subsequent transfer. If the articles are large relatively to the width of channelway and tend to stick in the channelway, the ribs may be separated and the stack easily removed.

I claim:

1. In a machine for forming columns of thin flat articles of the nature of cookies, crackers or the like, precedent to removal of stack portions of said columns, which machine includes a stack pickup table adapted for manual pickup operation, said table including a smooth flat top having its machine proximate end apertured at equal intervals, and complementary apertures at its terminal end, parallel, equally spaced ribs dividing the surface of said table into channelways, means engaging said machine proximate apertures anchoring the machine proximate ends of said ribs to said table, and tension springs in pairs engaging said terminal end apertures and the terminal ends of said ribs, resiliently securing said ribs to said table, said ribs intermediate their length being free from anchoring engagement to said table.

2. In a machine which includes longitudinal channelways and means for forming columns of thin, flat articles as cookies, crackers or the like on edge, face to back in said channelways and moving said article columns through said passageways pursuant to manual removal of stacks of said articles, a stack pickup table at the delivery end of said machine, said table adjacent said delivery end being of width to carry channelway continuations of all the channelways of said machine and of length to provide stations for at least one pickup operator on each side of said table and therebeyond is inwardly stepped to substantially one-half width and continued to a length providing an additional pickup operator station on each of its sides, and provided with longitudinal ribs spaced to form with the surface of said table continuations of said machine channelways said ribs extending from the machine proximate end of said table to the respective terminal ends of said table and means anchoring said ribs at their opposite ends to said table, said anchoring means at one end of said ribs consisting of spring means.

3. In a machine for forming columns of thin flat articles of the nature of cookies, crackers or the like, precedent to removal of stack portions of said columns, which machine includes a stack pickup table adapted for manual pickup operation, said table including a smooth flat top having at its forward end equally spaced anchor slots and at its rear end complemental apertures, and parallel equally spaced ribs dividing the surface of said table into channelways, said ribs each comprising two strips of thin resilient material having their upper edges in abutting relation and secured together at intervals along the length of said ribs, said strips diverging downward from the top of said ribs to form ribs of inverted V cross section, said strips each having at its forward end a vertically depending lug portion adapted for slot engagement, and at its terminal end said rib being resiliently secured to said table by tension springs, engaged at their upper ends to the ridge of said rib and diverging downward therefrom to and engaged with said table apertures.

4. In a machine for forming columns of thin flat articles of the nature of cookies, crackers or the like, a stack pickup table adapted for manual pickup operation, said table having a smooth flat top apertured at uniform intervals along its machine proximate end, and having complementary apertures at its terminal end, parallel, equally spaced ribs dividing the surface of said table into channelways, said ribs each comprising two strips of thin resilient material having their upper edges in abutting relation and secured together at intervals along the length of said ribs, said strips diverging downward from the top of said ribs to form ribs of inverted V cross section, the machine proximate ends of said strips having downwardly extending portions adapted for aperture engagement and anchorage to said table, and the terminal ends of said ribs being anchored to said table by terminal tension springs, said springs at their upper ends being engaged with the ridge of said rib and diverging downward therefrom to and engaged with said terminal end apertures of said table, said ribs intermediate their length being free from anchoring engagement to said table.

5. In a machine for forming stacks of thin flat articles of the nature of cookies, crackers or the like, which includes a stack pickup table adapted for manual pickup operation, which table includes a smooth flat top having a full width machine adjacent portion and a continuing stepped in center portion of substantially half width and double length, and parallel, equally spaced ribs dividing the surface of said table into channelways, said ribs each comprising two strips of thin resilient material having their upper edges in abutting relation and secured together at intervals along the length of said ribs, said strips diverging downward from the top of said ribs to form ribs of inverted V cross section, the machine proximate ends of said ribs being anchored to the top of said table, said ribs being of length to extend the length of the respective sections they overlie, the machine remote end of said rib being resiliently secured to said table by tension springs, engaged at their upper ends to the ridge of said ribs and diverging downward therefrom to and engaged with said table, all of said ribs being free from anchoring engagement to said table intermediate their ends.

6. In a machine for forming columns of thin flat articles of the nature of cookies, crackers or the like, precedent to removal of stacks of portions of said columns, a stack pickup table for manual operation, which table includes a smooth flat top having at its machine proximate end equally spaced anchor slots and at its terminal end complementary pairs of longitudinally alined and parallel, equally spaced ribs dividing the surface of said table into channelways, said ribs each comprising a thin strip of resilient material of length to extend from end to end of said table, said strips each having at its machine proximate end, a downwardly extending lug portion adapted for engagement with said anchor slot, the machine remote end of said rib being resiliently secured to said table top by tension springs, engaged at their upper ends to the top of said rib and diverging downward therefrom to and engaged with said anchor apertures, said ribs intermediate their length being free from anchoring engagement to said table.

7. A machine for assembling and alining thin flat articles such as cookies, crackers or the like, face to back in elongated columns for access and removal, including means forming downwardly inclined channelways, each respectively for receiving a row of said articles edge to edge in flatwise position, rotary means for upending individual said articles successively, swinging means disposed above and forwardly of the rotational center of said upending means, depending into the path of the upper portion of said articles as they are successively upended, said upending means including a portion for pushing each said upended article forward against previously upended articles in column relation and advancing said column, said swinging means being displaceable to permit passage of said article therebeneath, and adapted to return to engaging position subsequent to passage of said displacing article.

8. A machine for assembling and alining thin flat articles such as cookies, crackers or the like, face to back in elongated columns for access and removal, including means forming downwardly inclined channelways, each respectively for receiving a row of said articles edge to edge in flatwise position, and each respectively having rotary means for upending individual said articles successively, a gate, hinge means at the upper edge of said gate supporting said gate above and forwardly of the rotational center of said upending means, said gate being of length to depend into the path of the upper portion of said articles as they are successively upended, said upending means including portions for pushing each said upended article forward against previously upended articles in column relation and advancing said column, said gate being displaceable by each said article successively to permit passage of said article therebeneath, and adapted to return to engaging position subsequent to passage of said displacing article.

9. A machine for assembling and alining thin flat articles such as cookies, crackers or the like, face to back in elongated columns for access and removal; said machine including base and wall means forming downwardly inclined channelways, and angularly disposed base and wall means forming continuing channelways extending horizontally away from the lower ends of said inclined channelways, each said inclined channelway respectively being adapted to receive a row of said articles edge to edge in flatwise position, rotary cam means journalled substantially at the level of the base portion of said horizontal channelway and rearward of the intersection of said channelways, means for driving said cam means and gate means; said cam means including cam portions, each having a substantially radial rear face, a substantially parallel forward face spaced therefrom for upending individual said articles successively, and an end portion rearwardly curving into said radial face at right angles for pushing said upended articles forward against previously upended articles in column relation and advancing said columns; gate means each including hinge means disposed above and slightly forward of the center of said cam, a gate depending from said hinge means into the path of the upper portion of said articles as they are successively upended, said gate resisting overturning movement and being displaceable to permit passage of said article therebeneath, and adapted to return to engaging position subsequent to passage of said displacing article.

10. A machine for assembling and alining thin flat articles such as cookies, crackers or the like, face to back in elongated columns for access and manual removal in stacks; said machine including an elongated frame, an endless belt, journalled and supported by said frame with the upper flight of said belt in substantially horizontal position to receive batches of said articles and means for forwardly and steadily advancing said upper flight, and said articles thereon to discharge; transversely disposed separator means carried by said frame, said separator means including pins spaced at equal intervals in excess of the diameter of said articles and extending into immediate adjacency to said belt and means for transversely vibrating said separator means to divide said batches into uniformly spaced rows; column alining means, including a second endless belt journalled and supported by said frame forwardly of the first said belt with its rearward end positioned to receive articles discharged from said first belt and means for driving said second belt, frame supported ribs, extending longitudinally in channelway forming, overlying relation to said belt, said ribs being spaced at equal intervals conforming to said pin spacing and having their rearward ends alined to position the rearward ends of said channelways to receive the rows of articles discharged from said first belt, said ribs diverging between their rear and front ends of the nature of one half channel width from the line of travel of said belt, to accomplish diversion of said articles into said alinement; frame carried upending means including a base plate of belt width having inclined and horizontal portions and ribs spaced in conformity with the rib spacing of said alining means, disposed to receive between the ribs of said inclined portion articles discharged from said second belt; cams including lug portions adapted to upend and forwardly advance said articles, journaled adjacent the intersection of said portions and means for driving said cams; and a pickup table having longitudinally extending ribs in alinement with the ribs of said upending means.

11. In a machine for assembling articles into elongated rows, an alining section comprising an endless driven belt extending substantially from end to end of said section, a plurality of plate-like ribs overlying and in perpendicular relation to said belt, a pair of supports above and spanning said belt and respectively positioned adjacent the opposite ends of said section, one of said supports having a plurality of notches along its upper edge, each said rib having a hanger integrally secured thereto, each said hanger detachably engaging a said notch to support said ribs at one end, each said rib having a rod rigidly secured adjacent its opposite end, said other support consisting of a pair of strip-like members rigidly secured in spaced relation, said rods adjustably and shiftably engaging the other said support between said strips, and means for fixing said rods to said other support in adjusted position to support the opposite ends of said ribs.

12. In a machine for assembling articles into elongated rows, an alining section comprising an endless driven belt extending substantially from end to end of said section, a plurality of plate-like rigs overlying and in perpendicular relation to said belt, a pair of supports above and spanning said belt and respectively positioned adjacent the opposite ends of said section, one of said supports having a plurality of notches along its upper edge, each said rib having a hanger integrally secured thereto, each said hanger engaging a said notch to support said ribs at one end, each said rib having a rod rigidly secured adjacent its opposite end, said rods adjustably and shiftably engaging the other said support, and means for fixing said rods to said other support in adjusted position to support the opposite ends of said ribs.

13. In a machine for assembling articles into elongated rows, an alining section comprising an endless driven belt extending substantially from end to end of said section, a plurality of plate-like ribs overlying and in perpendicular relation to said belt, a pair of supports above and spanning said belt and respectively positioned adjacent the opposite ends of said section, each said rib having a hanger integrally secured thereto, said hangers engaging one said support to support said ribs at one end, each said rib having a rod rigidly secured adjacent its opposite end, said other support consisting of a pair of strip-like members rigidly secured in spaced relation, said rods adjustably and shiftably engaging the other said support between said strips, and means for fixing said rods to said other support in adjusted position to support the opposite ends of said ribs.

14. A machine for assembling and alining thin flat articles such as cookies, crackers or the like, in elongated columns for access and removal, including means forming channelways for receiving rows of said articles in flatwise position, rotary means for upending individual said articles successively, swinging means disposed above the rotational center of said upending means, depending into the path of the upper portion of said articles as they are successively upended, said swinging means being displaceable to permit passage of said article therebeneath, and adapted to return to engaging position subsequent to passage of said article.

15. A machine for assembling and alining thin flat articles such as cookies, crackers or the like, in elongated columns for access and removal, including means forming channelways, each respectively for receiving a row of said articles edge to edge in flatwise position, rotary means for upending individual said articles successively, swinging means disposed above the rotational center of said upending means, depending into the path of the upper portion of said articles as they are successively upended, said upending means including a portion for pushing each said upended article forward against previously upended articles in column relation and advancing said column, said swinging means being displaceable to permit passage of said article therebeneath, and adapted to return to engaging position subsequent to passage of said article.

16. In a machine for assembling and alining thin flat articles, such as cookies, crackers, or the like, in elongated columns for access and removal, means for delivering rows of said articles in flatwise position, means forward of said delivering means for receiving rows of said articles in upstanding position, rotary upending means positioned adjacent the forward end of said delivering means, to successively extend into the path of said articles to engage and shift flatwise said articles into upstanding position upon rotation of said rotary means, hinge means overlying and slightly forward of the rotational center of said rotary means, and swinging means swingingly supported on said hinge means, said swinging means when at rest depending vertically from said hinge means in a plane which intersects the cylinder of rotation of said rotary means, and being of a length to extend from said hinge means substantially to the rotational periphery of said rotary means, whereby said swinging means is successively engaged by said articles during shift to prevent overtravel of said articles beyond upstanding position.

17. In a machine for assembling and alining thin flat articles, such as cookies, crackers, or the like, in elongated columns for access and removal, means for delivering rows of said articles in flatwise position, means forward of said delivering means for receiving rows of said articles in upstanding position, rotary upending means positioned adjacent the forward end of said delivering means, to successively extend into the path of said articles to engage and shift flatwise said articles into upstanding position upon rotation of said rotary means, support means overlying and slightly forward of the rotational center of said rotary means, and swinging means swingingly supported on said support means, said swinging means when at rest depending substantially vertically from said support means in a plane which intersects the cylinder of rotation of said rotary means, and being of a length to extend from said support means toward the rotational periphery of said rotary means into the path of the upper portions of said articles during shift to prevent overtravel of said articles beyond upstanding position.

18. In a machine for assembling and alining thin flat articles, such as cookies, crackers, or the like, in elongated columns for access and removal, means for engaging flatwise said articles and successively shifting them into upstanding position, comprising rotary upending means positioned to successively extend into the path of said articles to engage and shift flatwise said articles into upstanding position upon rotation of said rotary means, support means overlying and slightly offset from the rotational center of said rotary means, and swinging means swingingly supported on said support means, said swinging means when at rest depending substantially vertically from said support means in a plane which intersects the cylinder of rotation of said rotary means, and being of a length to extend from said support means substantially to the rotational periphery of said rotary means, whereby said swinging means is successively engaged by said articles during shift to prevent overtravel of said articles beyond upstanding position.

References Cited in the file of this patent

UNITED STATES PATENTS

| | | |
|---|---|---|
| 804,459 | Ellingwood | Nov. 14, 1905 |
| 1,495,610 | Paridon | May 27, 1924 |
| 1,685,335 | Paterson | Sept. 25, 1928 |
| 2,183,433 | Rheinstorm | Dec. 12, 1939 |
| 2,307,822 | Clegg | Jan. 12, 1943 |
| 2,405,447 | Persson | Aug. 6, 1946 |
| 2,585,554 | Jackson | Feb. 12, 1952 |
| 2,596,228 | Fletcher | May 13, 1952 |

FOREIGN PATENTS

| | | |
|---|---|---|
| 430,393 | Great Britain | June 18, 1935 |